(12) United States Patent
Singh et al.

(10) Patent No.: US 11,279,081 B2
(45) Date of Patent: *Mar. 22, 2022

(54) TECHNOLOGY AND PROCESS FOR 3D PRINTING USING SWARF PARTICLES

(71) Applicants: INDIAN INSTITUTE OF TECHNOLOGY ROPAR, Punjab (IN); SWINBURNE UNIVERSITY OF TECHNOLOGY, Hawthorn (AU)

(72) Inventors: Malkeet Singh, Punjab (IN); Harpreet Singh, Punjab (IN); Christopher Charles Berndt, Hawthorn (AU); Prabir Sarkar, Punjab (IN)

(73) Assignees: INDIAN INSTITUTE OF TECHNOLOGY ROPAR; SWINBURNE UNIVERSITY OF TECHNOLOGY

( * ) Notice: Subject to any disclaimer, the term of this patent is extended or adjusted under 35 U.S.C. 154(b) by 35 days.

This patent is subject to a terminal disclaimer.

(21) Appl. No.: 16/540,736

(22) Filed: Aug. 14, 2019

(65) Prior Publication Data
US 2020/0039144 A1    Feb. 6, 2020

Related U.S. Application Data

(63) Continuation-in-part of application No. 16/352,331, filed on Mar. 13, 2019, now Pat. No. 10,835,920.

(30) Foreign Application Priority Data

Aug. 3, 2018   (IN) .............................. 201811029355

(51) Int. Cl.
B29C 64/141   (2017.01)
B22F 3/00    (2021.01)
(Continued)

(52) U.S. Cl.
CPC ............ *B29C 64/141* (2017.08); *B05C 19/04* (2013.01); *B22F 10/10* (2021.01); *B29C 64/20* (2017.08);
(Continued)

(58) Field of Classification Search
None
See application file for complete search history.

(56) References Cited

U.S. PATENT DOCUMENTS

| | | |
|---|---|---|
| 2,354,727 A | 8/1944 | Wulff |
| 4,040,162 A | 8/1977 | Isogai et al. |

(Continued)

FOREIGN PATENT DOCUMENTS

| | | |
|---|---|---|
| CN | 103639412 A | 3/2014 |
| DE | 102010014747 A1 | 10/2011 |
| DE | 102015002967 A1 | 10/2016 |

*Primary Examiner* — Jethro M. Pence
(74) *Attorney, Agent, or Firm* — Hayes Soloway P.C.

(57) ABSTRACT

Disclosed is a technology being implemented in an apparatus for depositing multiple layers of a stream of swarf particles. The stream of swarf particles is generated by interfacing a cutting abrasive wheel on a workpiece. The generated stream of swarf particles may be directed towards a cavity of a die. Multiple layers of stream of swarf particles further results in a 3D printed object that takes the shape of the cavity of the die. The apparatus may also be used to coat substrates. Substrates may include but not limited to metal surfaces, polymers, and ceramics.

5 Claims, 7 Drawing Sheets

(51) Int. Cl.
    *B29C 64/20*     (2017.01)
    *B33Y 10/00*     (2015.01)
    *B33Y 30/00*     (2015.01)
    *B33Y 70/00*     (2020.01)
    *B05C 19/04*     (2006.01)
    *B22F 10/10*     (2021.01)
    *B29K 105/26*     (2006.01)
    *B29K 77/00*     (2006.01)

(52) U.S. Cl.
    CPC ............... *B33Y 10/00* (2014.12); *B33Y 30/00* (2014.12); *B33Y 70/00* (2014.12); *B29K 2077/00* (2013.01); *B29K 2105/26* (2013.01)

(56) References Cited

U.S. PATENT DOCUMENTS

| | | |
|---|---|---|
| 6,780,368 B2 | 8/2004 | Liu et al. |
| 8,826,938 B2 | 9/2014 | Moore |
| 2009/0112355 A1* | 4/2009 | Hyatt ...................... B24B 53/00 |
| | | 700/164 |
| 2010/0071271 A1* | 3/2010 | Soma ................. B24D 18/0009 |
| | | 51/297 |
| 2016/0009029 A1 | 1/2016 | Cohen et al. |
| 2018/0186091 A1 | 7/2018 | Wu et al. |

* cited by examiner

TECHNOLOGY AND PROCESS FOR 3D PRINTING USING SWARF PARTICLES

CROSS-REFERENCE TO RELATED APPLICATIONS AND PRIORITY

The present application is a Continuation-in-Part of the U.S. patent application Ser. No. 16/352,331 filed on Mar. 13, 2019, which itself claims priority from Indian Application Number 201811029355 filed on Aug. 3, 2018.

TECHNICAL FIELD

The present subject matter described herein, in general, relates to 3D printing by forming multiple layers of swarf particles deposited in a cavity of a die.

BACKGROUND

In the domain of surface engineering, there are several techniques available to perform 3D printing such as Direct Metal Laser Sintering (DMLS) and Selected Laser Melting (SLM) printing technology. It has been observed that using the aforementioned techniques for 3D printing may lead to various challenges. For example, the techniques have to be performed in a tightly controlled atmosphere and high-power laser beam needs to be directed in order facilitate adhesion of powder onto the surface of a substrate. In addition to the above, the powder used for 3D printing is expensive thereby leading to the increase in the overall cost of the 3D printing.

SUMMARY

Before the present system and method are described, it is to be understood that this application is not limited to the particular machine or an apparatus, and methodologies described, as there can be multiple possible embodiments that are not expressly illustrated in the present disclosures. It is also to be understood that the terminology used in the description is for the purpose of describing the particular versions or embodiments only and is not intended to limit the scope of the present application. This summary is provided to introduce aspects related to a technology being implemented in an apparatus for 3D printing by a stream of swarf particles deposited in a cavity of a die. The aspects are further elaborated below in the detailed description. This summary is not intended to identify essential features of the proposed subject matter nor is it intended for use in determining or limiting the scope of the proposed subject matter.

In one implementation, a technology being implemented in an apparatus for 3D printing by depositing a stream of swarf particles in a die. The apparatus comprises a plunger, the die, a vice, an abrasive cutting wheel and a cutter spindle. The plunger, holding the die, may be affixed to the die using a bolt. The vice may hold the workpiece. The abrasive cutting wheel may rotate on a cutter spindle at a predefined Rotations Per Minute (RPM). The abrasive cutting wheel may be mounted at a predefined height over the vice. Further, the abrasive cutting wheel may be used for cutting the workpiece to generate the stream of swarf particles. It may be noted that the stream of swarf particles, generated upon cutting the workpiece, may be directed towards the die held by the plunger. The stream of swarf particles may get deposited in the cavity of the die thereby forming multiple coating layers in the cavity. The multiple coating layers in the cavity resulting into a 3D printed object. The shape of the 3D printed object may depend on the shape of the cavity of the die.

BRIEF DESCRIPTION OF THE DRAWINGS

The foregoing summary, as well as the following detailed description of embodiments, is better understood when read in conjunction with the appended drawings. For the purpose of illustrating the disclosure, there is shown in the present document example constructions of the disclosure, however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

Figure 1:
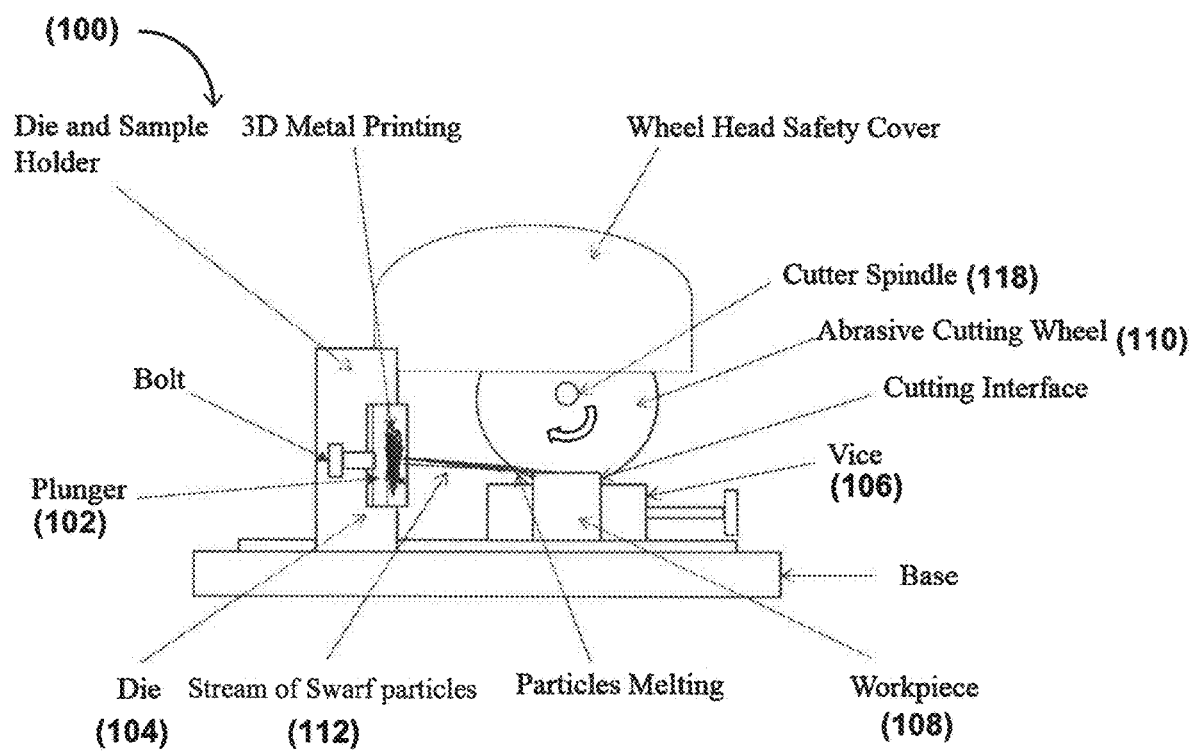
FIG. 1 illustrates a schematic diagram of the process and the set-up, in accordance with an embodiment of the present subject matter.

The figures depict various embodiments of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated but is to be accorded the widest scope consistent with the principles and features described herein.

The present invention discloses a technology and process to form a 3D printed object using an apparatus is disclosed. The apparatus includes a plunger, a die, a vice, an abrasive cutting wheel and a cutter spindle. The plunger holds the die whereas the vice holds a workpiece. The abrasive cutting wheel, on the other hand, is placed at a predefined height over the vice. The abrasive cutting wheel is placed under a wheel head safety cover.

The abrasive wheel is configured to rotate, on a cutter spindle, at a predefined Rotations per Minute (RpM). The abrasive cutting wheel cuts the workpiece thereby generating a stream of swarf particles. As the abrasive cutting wheel cuts the workpiece, the stream of swarf particles has high temperature. It may be noted that the stream of swarf particles may comprise of large amounts of micro-sized particles. The stream of swarf particles, generated due to the cutting, gets directed towards a cavity of the die. It may be understood that the abrasive cutting wheel continuously deposits the stream of swarf particles in the cavity until the cavity of the die gets filled with multiple layers of coating. After cooling the multiple layers of coating at room temperature, the multiple layers of coating take a shape of the die resulting into the 3D printed object. The 3D printed object may further be taken out of the cavity of the die.

In one embodiment, the technology and process that performs deposition of multiple layers of the stream of swarf particles to form the 3D printed object may be carried out in a closed environment. In one aspect, the closed environment may comprise of an inert gas atmosphere facilitating chemically inactive environment. The inert gas atmosphere facilitates mitigating the risk of the 3D printed object being contaminated with reactive gases. The reactive gases may alter the characteristics of the stream of swarf particles thereby resulting in formation of non-uniform 3D printed object. In one aspect, the contamination is avoided by hindering chemical reaction of swarf particles with reactive gases that may be present in the air.

In another embodiment, the temperature of the stream of swarf particles may be altered by applying compressed air to a heated area including a point of feed of the cutting abrasive wheel and the workpiece during the cutting action. The heated area may further include the point of deposition of the steam of swarf particles in the cavity of the die. The temperature control of the deposition process may be used to alter the characteristics of the 3D printed object. The characteristics of the 3D printed object may include but not limited to strength of the bonding.

In yet another embodiment, the predefined Rotations per Minute (RpM) of the abrasive cutting wheel, feeding of abrasive cutting wheel on the workpiece, geometrical arrangements such as a stand-off distance and an angle of impact may be controlled by a controller. In one aspect, the stand-off distance indicates the distance between the workpiece and the die. Post removal of the stream of swarf particles from the workpiece due to the cutting process, the stream of swarf particles is directed towards the cavity of the die which then adhere to each other forming multiple layers.

Now referring to FIG. 1, the schematic diagram of the apparatus 100 is shown in the FIG. 1. As described earlier, the apparatus 100 comprises a plunger 102 holding a die 104. The apparatus further comprises a vice 106 for holding a workpiece 108. An abrasive cutting wheel 110 may be located at a predefined height above the vice 106. The apparatus 100 further comprises the workpiece 108 immovably positioned below the abrasive cutting wheel 110.

In order to perform 3D printing, the abrasive cutting wheel 110 is enabled to rotate at a desired Rotations per Minute (RpM) speed. Once the abrasive cutting wheel 110 is rotated at the desired RpM speed, the abrasive cutting wheel 110 may be moved upwardly and downwardly to cut the workpiece 108. The cutting of the workpiece 108 by the abrasive cutting wheel 110, at desired RPM, produces a stream of swarf particles 112 (hereinafter may be referred to as swarf particles 112 or a stream of randomly sized swarf particles 112), further directed towards the cavity of the die 104, as shown in FIG. 1. As the abrasive cutting wheel 110, rotating at a very high RpM speed, cuts the workpiece 108 to generate the stream of swarf particles 112 having high temperature. It may be noted that the stream of swarf particles may comprise of large amounts of micro-sized particles.

In one embodiment, a thickness of the abrasive cutting wheel 110 may be 3 millimeters (mm). The temperature of the stream of swarf particles 112 may be around 660 degree Celsius. The high temperature of the stream of swarf particles 112 may be a result of the friction between the abrasive cutting wheel 110 and the workpiece 108. Due to such a high temperature, swarf particles 112 may get adhered to each other inside the cavity of the die 104. In one aspect, the speed, temperature and the shape of the stream of swarf particles 112 may be changed based on at least one of a cutting time or a set of cutting variables. Examples of the set of cutting variables may include, but not limited to, Longitudinal Feed, Rotations per Minute (RpM) speed of the abrasive cutting wheel 110 and geometrical arrangements such as stand-off distance between the workpiece 108 and the die 104. It may further be noted that the stream of swarf particles 112 may be deposited in at least one shape including but not limited to spherical, needle and platelet.

In order to support the aforementioned description, various experiments have been performed in an open environment. The experimental data of one such experiment is given below. It may be noted that the temperature of the die 104 is constantly increased due to continuous striking of the stream of swarf particles 112 into the cavity of the die 104 i.e. a 3D printing process. This increase in the temperature of the die 104 during the 3D printing process is found to be directly proportional to the cutting time or the cutting variable from the set of cutting variables.

In order to further elucidate the capability of the apparatus 100, at least one of a metal and a non-metal may be used as the workpiece 108 to perform experimentation. The workpiece 108 is fixed on the vice 106 below the cutting abrasive wheel 110. Before starting the cutting process, the abrasive cutting wheel 110 is moved longitudinally to interface the workpiece 108 with the abrasive cutting wheel 110. During the cutting process, friction occurs between the abrasive wheel 110 and the workpiece 108. As a result of that, a stream of hot randomly sized swarf particles 112 is generated and directed towards the cavity of the die 104. Consequently, the workpiece 108 material directly converts into the stream of randomly sized swarf particles 112, which will directly deposit into the cavity of the die 104. After cooling down of the stream of swarf particles 112 in cavity of the die 108, the shape of a final object is determined by shape of the cavity.

Example 1

While using the low carbon steel as the workpiece 108, low carbon steel swarf particles are directed by the abrasive cutting wheel 110 during the 3D printing processing in accordance with the preferred parameters as mentioned below in Table 1. Similarly, Nylon is used as the workpiece 108 for the purpose of 3D printing process with the preferred parameters as mentioned in Table 1. The swarf particles 112 of nylon and low carbon steel that are generated by the abrasive wheel 110 may be ultrafine grained material of 60 micro-meter average diameter. A desirable microstructure from a metallurgical perspective is exhibited by the cooled swarf particles 112 that act as the 3D printed object.

TABLE 1

| Sr. No. | Tool material (workpiece) | Die material during coating | Process printing/layer | Stand-off distance (mm) | Abrasive cutter speed (RPM) |
|---|---|---|---|---|---|
| 1 | Low Carbon steel | NA | Metal printing | 257 | 3800 |
| 2 | Low Carbon steel | NA | Metal printing | 200 | 3800 |
| 3 | Nylon | NA | Polymer printing | 257 | 3800 |
| 4 | Nylon | NA | Polymer printing | 200 | 3800 |
| 5 | Nylon | Nylon (Substrate) | Polymer printing | 257 | 3800 |
| 6 | Nylon | Nylon (Substrate) | Polymer printing | 200 | 3800 |
| 7 | Nylon | Acrylic (Substrate) | Polymer printing | 257 | 3800 |
| 8 | Nylon | Acrylic (Substrate) | Polymer printing | 200 | 3800 |

Figure 2A:
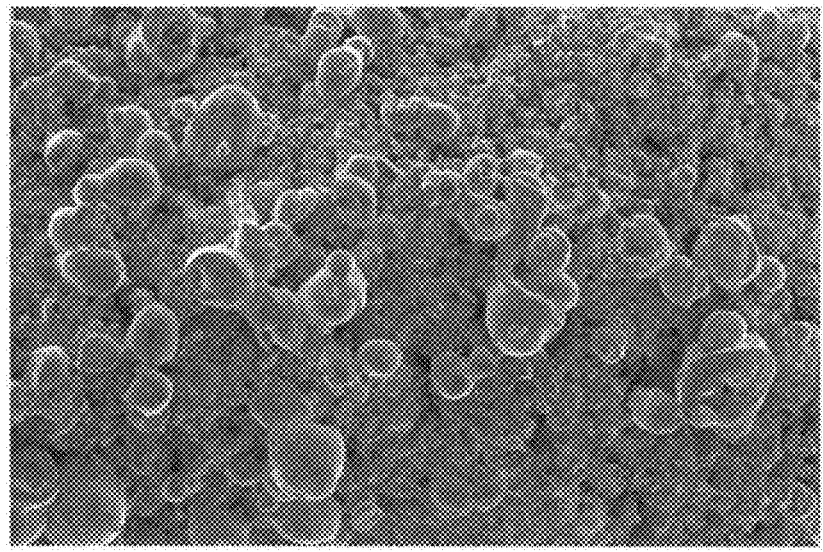
FIGS. 2(a) and 2(b) illustrates Scanning Electron Microscopy (SEM) microstructure image of the adhered swarf particles of low carbon steel as the workpiece into cavity of the die for stand-off distances of 257 mm and 200 mm respectively.
Figure 2B:
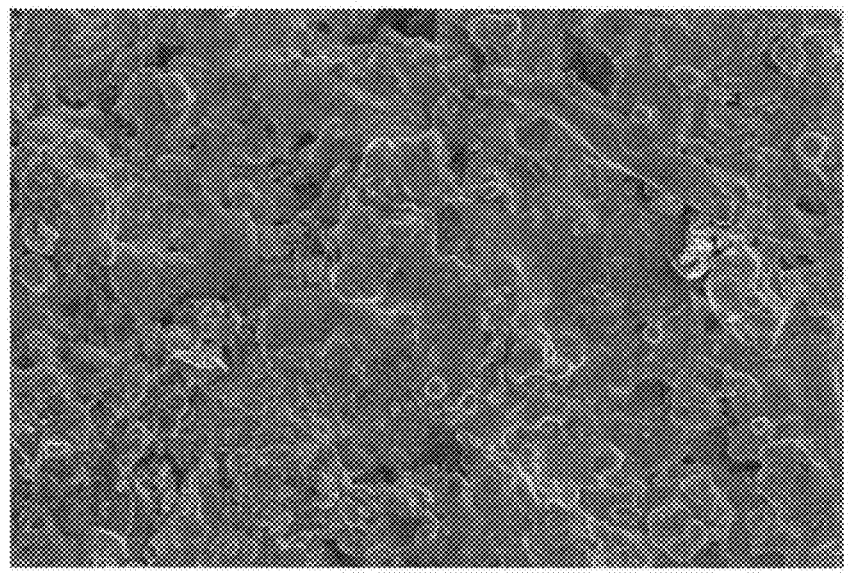

Now, referring to first and second rows of the table 1, considering low carbon steel is used as the workpiece 108, FIGS. 2 (*a*) and 2 (*b*) depicts a Scanning Electron Microscopy (SEM) microstructure image of the adhered swarf particles 112 of low carbon steel for stand-off distance of 257 mm and 200 mm respectively. The applicability of the 3D printing is suitable to manufacture articles including, but not limited to metal toys, decorative products and articles having complex shapes is produced.

Figure 3A:
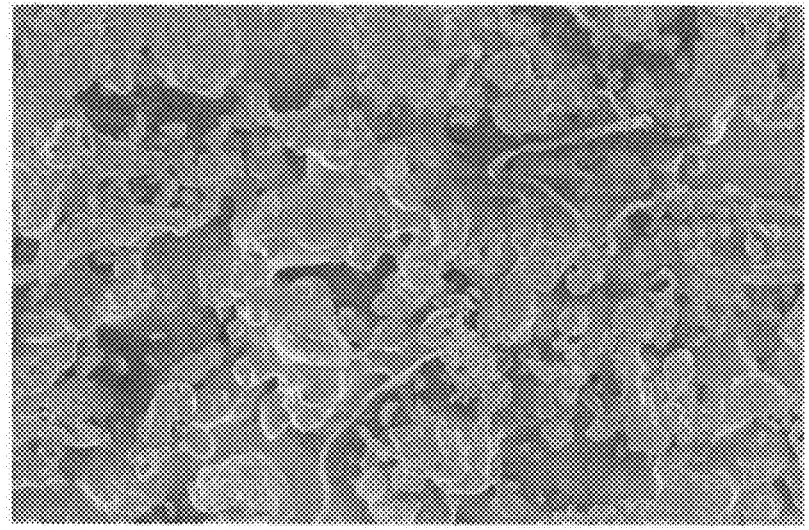
FIGS. 3(a) and 3(b) illustrates SEM microstructure image of the adhered swarf particles of nylon as the workpiece into cavity of the die for stand-off distances of 257 mm and 200 mm respectively.
Figure 3B:
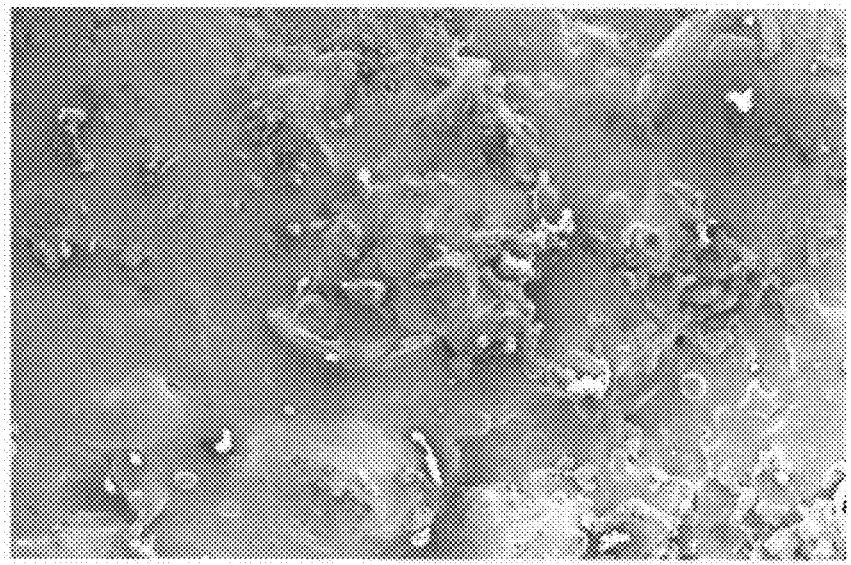
Figure 4A:
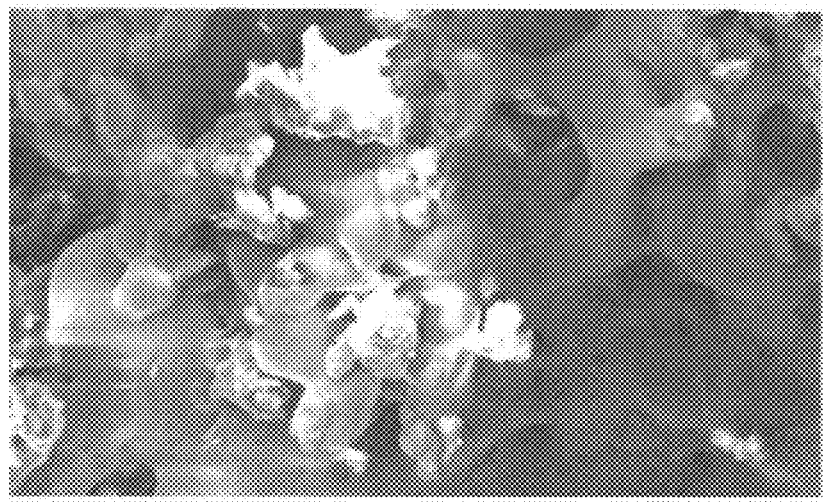
FIGS. 4(a) and 4(b) depicts the SEM microstructure image of the adhered swarf particles 112 of nylon as the workpiece on a nylon substrate for stand-off distance of 257 mm and 200 mm respectively.
Figure 4B:
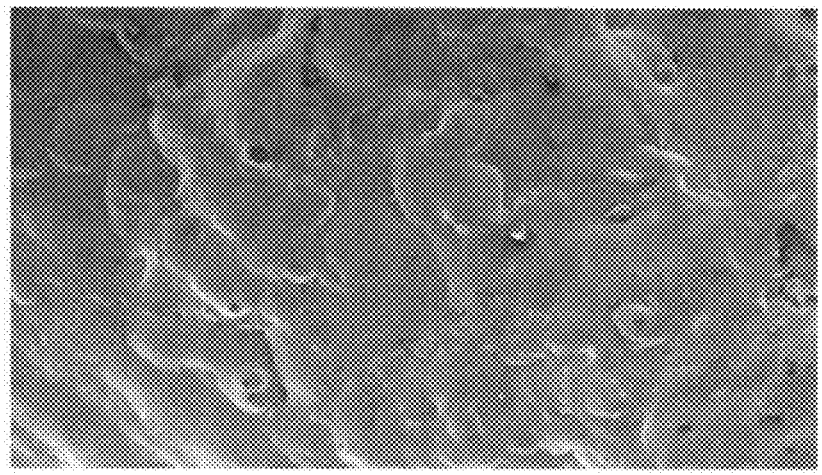
Figure 4C:
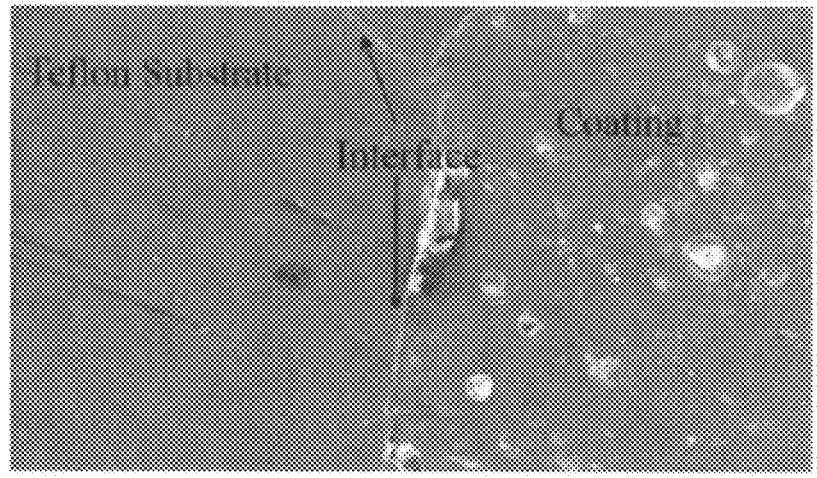
FIG. 4(c) and FIG. 4(d) depicts SEM image of cross-sectional view of a point of contact between the nylon substrate and nylon workpiece for 257 mm and 200 mm respectively.
Figure 4D:
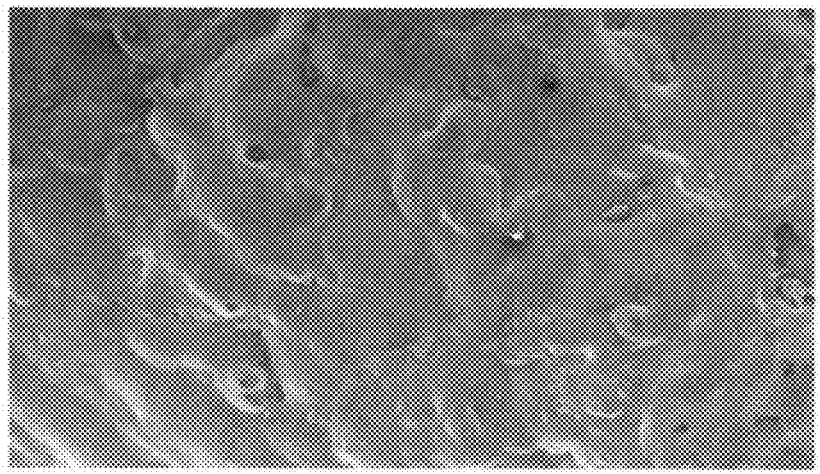
Figure 5A:
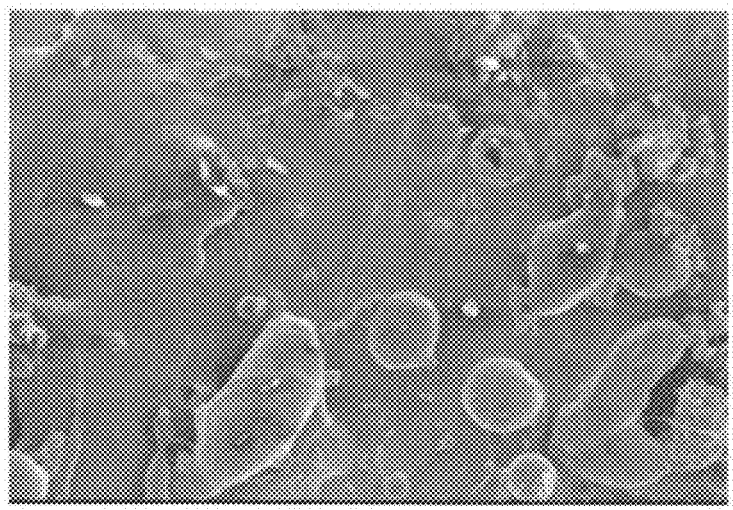
FIGS. 5(a) and 5(b) depicts the SEM microstructure image of the adhered swarf particles 112 of nylon on acrylic substrate for stand-off distance of 257 mm and 200 mm respectively.
Figure 5B:
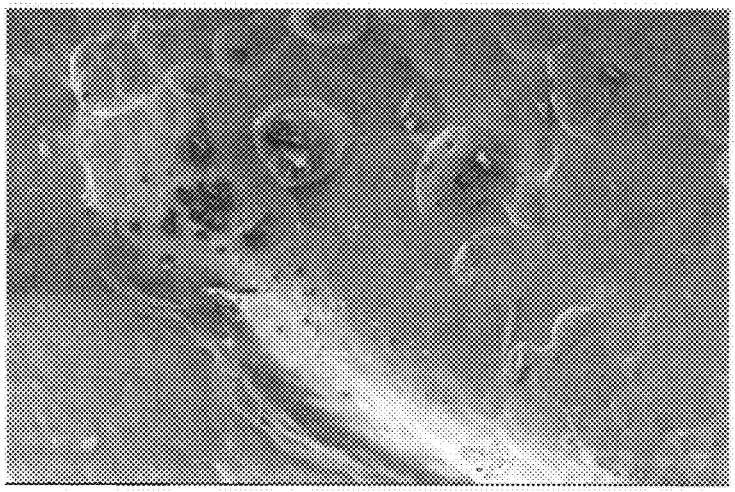
Figure 5C:
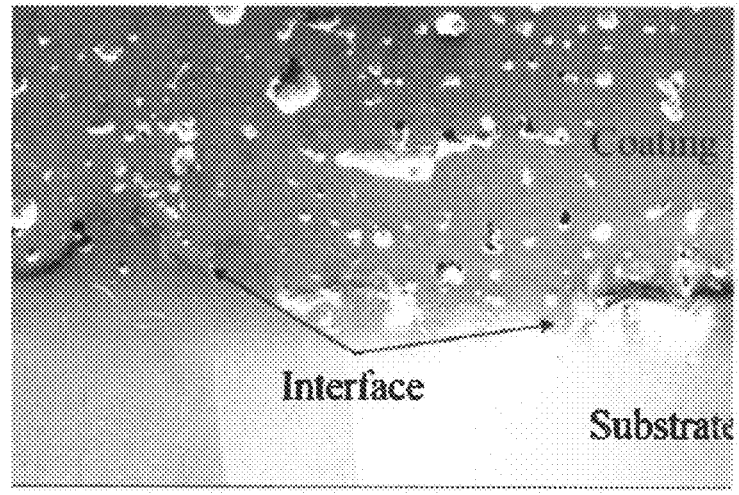
FIGS. 5(c) and 5(d) depicts an SEM image of cross-sectional view of a point of contact between the acrylic substrate and nylon workpiece for stand-off distance of 257 mm and 200 mm respectively.
Figure 5D:
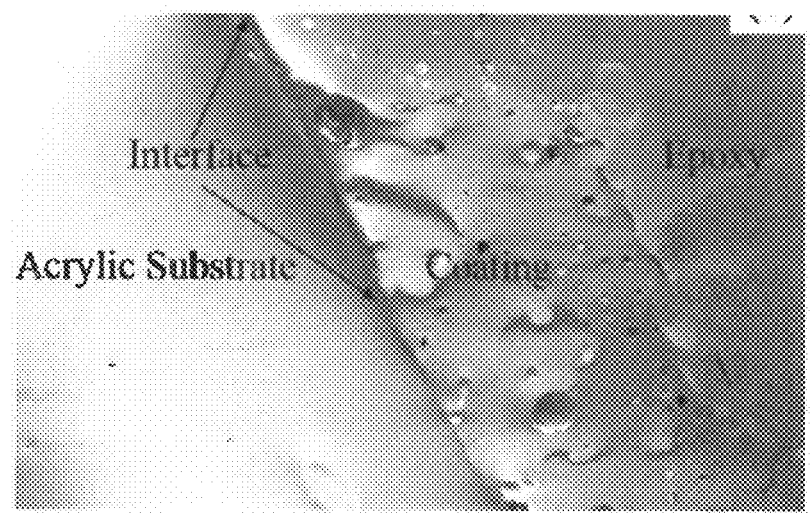

Referring to second and third rows of the table 1, considering nylon is used as the workpiece 108, FIGS. 3 (*a*) and 3 (*b*) depicts the SEM microstructure image of the adhered swarf particles 112 of nylon for stand-off distance of 257 mm and 200 mm respectively. The applicability of the 3D polymer printing includes but not limited to polymer toys, sculptures, patterns for wax products, decorative products, complex shapes and similar artifacts.

Referring to fifth and sixth rows of the table 1, nylon is used as the workpiece 108 and instead of the die 104, a substrate is used of a nylon material. FIGS. 4(*a*) and 4(*b*) depicts the SEM microstructure image of the adhered swarf particles 112 of nylon on nylon substrate for stand-off distance of 257 mm and 200 mm respectively. FIG. 4(*c*) and FIGS. 4(*d*) depicts SEM image of cross-sectional view of a point of contact between the nylon substrate and nylon workpiece for 257 mm and 200 mm respectively. The applicability of the 3D polymer printing of nylon workpiece on includes but not limited to polymer toys, sculptures, patterns for wax products, decorative products, complex shapes and similar artifacts.

Referring to seventh and eighth rows of the table 1, considering nylon is used as the workpiece 108 and instead of the die 104, the substrate of the acrylic material is used. FIGS. 5(*a*) and 5(*b*) depicts the SEM microstructure image of the adhered swarf particles 112 of nylon on acrylic substrate for stand-off distance of 257 mm and 200 mm respectively. FIGS. 5(*c*) and 5(*d*) depicts an SEM image of cross-sectional view of a point of contact between the acrylic substrate and nylon workpiece for stand-off distance of 257 mm and 200 mm respectively. The applicability of the 3D polymer printing of acrylic polymer with nylon workpiece 108 includes but not limited to decoration, repair of polymer artifacts and opaque polymer coatings.

To illustrate the capabilities of the apparatus (100), the description has been described with two types of workpiece 108, a metal (low carbon steel) and a non-metal (nylon) as mentioned in Table 1. Further it may be possible to perform the 3D printing using said technology being implemented in the apparatus (100) for a variety shapes of dies and various other types of substrates which have properties of soft as well as hard material and are not mentioned in this description.

Exemplary embodiments discussed above may provide certain advantages. Though not required to practice aspects of the disclosure, these advantages may include those provided by the following features.

The present apparatus is a sustainable and cost-effective 3D printing process as the waste material arising out of the cutting operation as used for many engineering applications.

The present apparatus facilitates dense 3D printing with an appropriate bonding that suits 3D printing application.

The invention claimed is:

1. An apparatus comprising:
    a plunger for holding a die, wherein the die is having variety of shapes;
    a vice for holding a workpiece; and
    an abrasive cutting wheel mounted at a predefined height over the vice such that the workpiece is immovably positioned below the abrasive cutting wheel, wherein the abrasive cutting wheel is of 3 mm thickness rotating on a cutter spindle at a predefined Rotations Per Minute (RPM) used for cutting the workpiece, wherein the abrasive cutting wheel moves upwardly and downwardly cutting the workpiece, thereby generating a stream of swarf particles directed towards cavity of the die, resulting into formation of a 3D printed object, wherein the 3D printed object comprises a multiple coating layers in the cavity generated from the stream of the swarf particles.

2. The apparatus as claimed in claim 1, wherein a material of the workpiece comprises at least one of: metal or non-metal.

3. The apparatus as claimed in claim 1, wherein the stream of swarf particles having a shape including at least one of: spherical, needle, or platelet, and wherein the shape is interchanged based on a set of cutting variables.

4. The apparatus as claimed in claim 3, wherein the set of cutting variables comprises Longitudinal Feed, Rotations Per Minute (RPM) of the abrasive cutting wheel and a stand-off distance between the workpiece and the die.

5. The apparatus as claimed in claim 1, wherein a range of predefined Rotations Per Minute (RPM) is up to 3800.

* * * * *